United States Patent
Schmitt

[19]

[11] Patent Number: 6,084,315

[45] Date of Patent: Jul. 4, 2000

[54] SYSTEM FOR OPERATING A CONTROL DEVICE IN A MOTOR VEHICLE

[75] Inventor: Hans-Walter Schmitt, Bloomfield, Mich.

[73] Assignee: Robert Bosch GmbH, Stuttgart, Germany

[21] Appl. No.: 09/194,686

[22] PCT Filed: Mar. 30, 1998

[86] PCT No.: PCT/DE98/00899

§ 371 Date: Dec. 1, 1998

§ 102(e) Date: Dec. 1, 1998

[87] PCT Pub. No.: WO98/44278

PCT Pub. Date: Oct. 8, 1998

[30] Foreign Application Priority Data

Apr. 1, 1997 [DE] Germany .............. 197 13 380

[51] Int. Cl.[7] ............................................... B60L 1/00
[52] U.S. Cl. .................. 307/10.1; 73/484; 180/336; 340/456
[58] Field of Search ................. 307/10.1; 340/441, 340/456; 73/484; 180/337, 336, 333

[56] References Cited

U.S. PATENT DOCUMENTS

| 3,742,447 | 6/1973 | Sognefest et al. ................ 307/10.1 |
| 3,746,876 | 7/1973 | Darrow ............................. 307/10.1 |
| 4,884,057 | 11/1989 | Leorat ............................... 180/336 |
| 5,117,710 | 6/1992 | Hiroyuki et al. . |
| 5,572,098 | 11/1996 | Dreon et al. .................... 307/10.1 |
| 5,886,419 | 3/1999 | Saito et al. ..................... 307/10.1 |

FOREIGN PATENT DOCUMENTS

| 0444997 | 9/1991 | European Pat. Off. . |
| 4123811 | 1/1993 | Germany . |

*Primary Examiner*—Albert W. Paladini
*Attorney, Agent, or Firm*—Walter Ottesen

[57] ABSTRACT

The invention relates to a system for operating a control apparatus in a motor vehicle. At least one input signal is applied to the control apparatus. The essence of the invention is that means are provided with the aid of which the control apparatus is activated in response to a change of the input signal. With the means of the invention, the control apparatus can correspondingly respond anytime to a change of the input signal. In an especially advantageous configuration, the means of the invention include a lower internal current draw than the activated control apparatus. According to the invention, one obtains a high operational reliability of the control apparatus without an excessive energy consumption because the means of the invention have only a low internal current draw and the control apparatus with the higher internal current draw is activated only as required (change of the input signal).

12 Claims, 1 Drawing Sheet

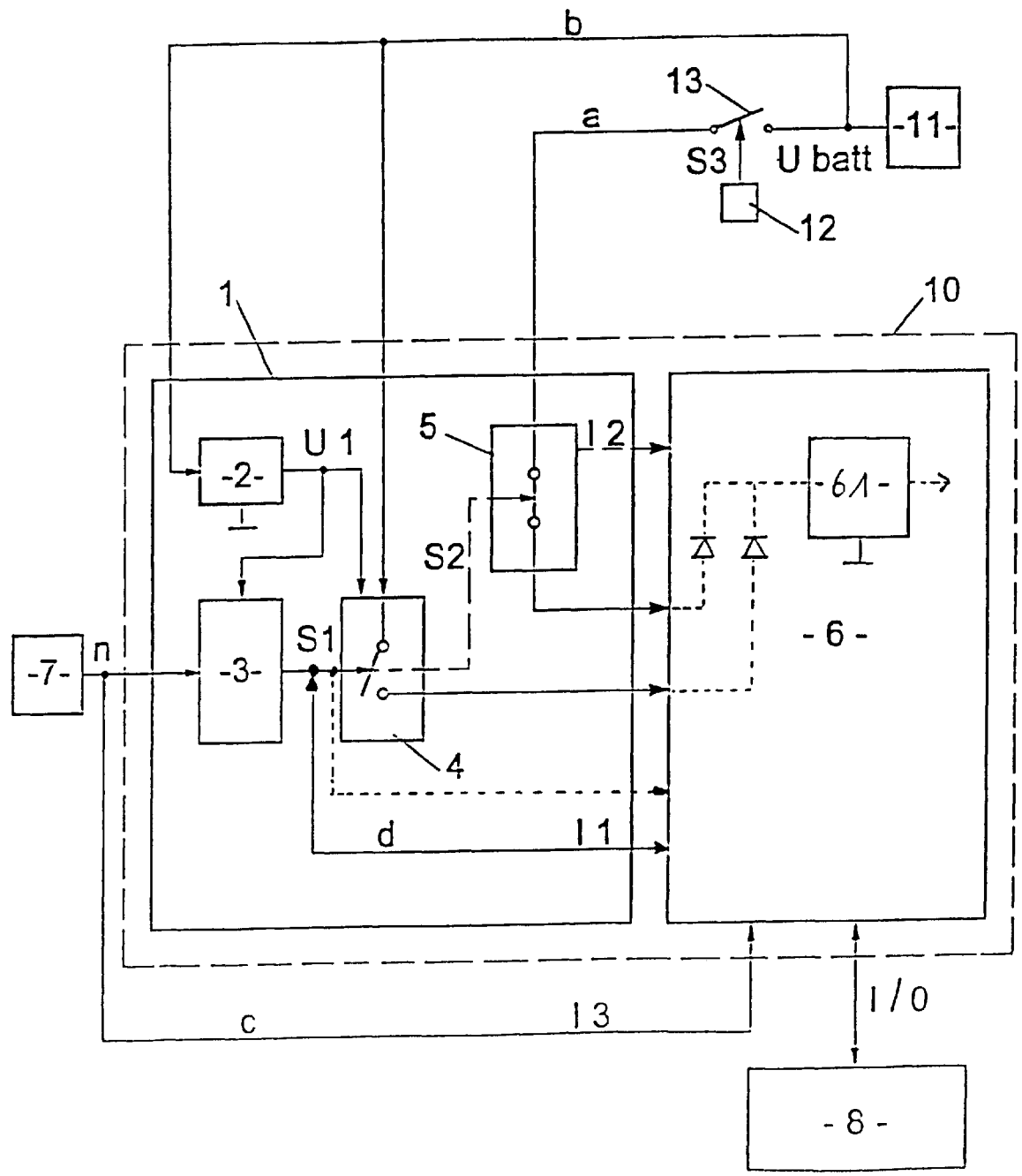

SYSTEM FOR OPERATING A CONTROL DEVICE IN A MOTOR VEHICLE

FIELD OF THE INVENTION

The invention relates to a system for operating a control apparatus in a motor vehicle.

BACKGROUND OF THE INVENTION

In vehicles having automatic transmissions, it is known, for example, to provide a selection lever (positions P, R, N, D, 3, 2, 1) which is actuable by the driver of the vehicle. Specific operating states of the transmission can be inputted with the activation of the selection lever. These operating states can, for example, affect the selection of specific transmission gears or the adjustment of a latching of the transmission (park mode). For vehicles having an electronic control apparatus of the automatic transmission, the premise is provided to replace the above-mentioned selection lever with a multi-poled electric switch and to realize the functions of the selection lever/selection switch electromechanically, for example, by an electric motor. The multi-poled electric switch can, for example, be on the steering column and is referred to hereinafter as a selection switch. The functions of the selection lever/selection switch were previously realized mechanically.

In motor vehicles, it is conventional to provide a driving or ignition switch which is actuated by the driver to start or switch off the vehicle. One refers to a switched-in or switched-off ignition. For a switched-off ignition, the above-mentioned electronic control apparatus of the automatic transmission is generally no longer supplied with current/voltage. If the driver now actuates the selection lever with the ignition switched off, then the position of the switch and the functions, which are to be initiated via the control apparatus, are no longer coincidental. This can, for example, lead to a dangerous situation when the driver only switches the selection switch into the position "P" (park) after switching off the ignition and then relies on the braking action/latching of the transmission. Similar effects are conceivable for so-called automated manual-shift transmissions. Here, conventional or modified manual transmissions are considered wherein the clutch pedal and shift lever or only one of these are replaced with an electromechanical drive.

A standard solution for the above-mentioned problem would be to leave the control apparatus permanently connected to the vehicle battery even when the ignition is switched off. This is disadvantageous because of the high current draw of such a system which can lead to a discharge of the battery, especially when the vehicle is at standstill for a long time.

SUMMARY OF THE INVENTION

The object of the present invention is to achieve a high operational reliability of a control apparatus without excessive energy consumption.

ADVANTAGES OF THE INVENTION

As already mentioned, the invention relates to a system for operating a control apparatus in a motor vehicle. Here, at least one input signal is applied to the control apparatus. The essence of the invention is that means are provided with which the control apparatus is activated in response to a change of the input signal. With the means according to the invention, the control apparatus can respond correspondingly anytime to a change of the input signal.

In an especially advantageous configuration, the means of the invention exhibit a lesser internal current draw than the activated control apparatus. With the invention, a high operational reliability of the control apparatus is achieved without an excessive consumption of energy because the means of the invention exhibit only a slight internal current draw and the control apparatus with the higher internal current draw is activated only when required (change of the input signal). For this purpose, it can be especially provided that the means exhibit a detection circuit, which is configured to be especially high resistive and/or switch means.

To have reduced internal current draw, it can be provided that a first energy supply device exhibits a lower internal current draw to satisfy the energy supply of the means according to the invention than the second energy supply device provided for the energy supply of the control apparatus. It is, however, possible that the means of the invention as well as the control apparatus have energy supplies (for example, current controllers) having similar low internal current draws. Then it becomes effective, as mentioned in the previous paragraph, that the means of the invention (supplied by the first energy supply device) consume less current than the control apparatus.

In a further advantageous configuration of the invention, it is provided that, and as already mentioned, the means have a first energy supply device. Furthermore, a second energy supply device is provided by means of which the control apparatus can be supplied with energy. In response to a change of the input signal, the second energy supply device is then activated for activating the control apparatus.

It can be provided that the activation of the control apparatus only takes place in an operating state in which the control apparatus is deactivated. For this purpose, a travel switch is provided by the actuation of which the control apparatus is brought into the operating state of deactivation.

In a further advantageous configuration of the invention, it is provided that the means activate the control apparatus for a pregiven time duration in response to a change of the input signal. Alternatively, it can be provided that the control apparatus remains activated for a pregiven time in response to an activation effected by the means, that is, the activation status is therefore maintained within the control apparatus. A further alternative can be provided in that the control apparatus remains activated in response to an activation effected by the means until the action, which is wanted by the change of the input signal, is completed by the control apparatus.

In an especially advantageous embodiment of the invention, it is provided that the input signal represents the position of a, so-called selection switch which can be actuated especially by the driver of the vehicle. Here, especially a selection switch is thought of which is described in the introduction of this description. The switch positions of the selection switch represent different (especially mechanical) operating states of the vehicle transmission. These operating states are then set by means of the control apparatus.

In a cost-effective configuration, the means of the invention together with the control apparatus are accommodated in one housing.

Furthermore, a travel switch can be provided with which the control apparatus is connected or disconnected from the vehicle battery when the travel switch is actuated. In the state, in which the connection to the vehicle battery is interrupted by the travel switch, the means of the invention activate the control apparatus or the second energy supply in response to a change of the input signal. It is therefore here especially thought that the control apparatus responds to a change of the input signal in a proper manner even when the actual current/voltage supply to the control apparatus is already interrupted.

An alternative or supplement to the above-mentioned realization of reduced internal current draw of the means of the invention can comprise that the means have a first energy supply device which supplies the means cyclically with energy for a pregiven time duration. For this variation of the invention, the energy-saving maintenance of the operational readiness of the control apparatus is achieved in that the means of the invention are cyclically provided with energy, that is, not continuously.

In this variation, it too can be provided that a travel switch is provided via which the control apparatus is activated or deactivated when the travel switch is actuated. The cyclical energy supply of the means takes place in a state wherein the control apparatus is deactivated by the travel switch, that is, in general, decoupled from the battery voltage.

Further advantageous configurations can be drawn from the dependent claims.

BRIEF DESCRIPTION OF THE DRAWING

The invention will now be described with respect to the single FIGURE which shows a circuit arrangement of the invention.

DESCRIPTION OF THE PREFERRED EMBODIMENTS OF THE INVENTION

In the figure, one embodiment of the idea of the invention is shown. For this purpose, a circuit according to the invention is shown with the reference numeral 1. The circuit is connected between the selection switch 7, which is described in the introduction, and the control apparatus 6 of an automatic transmission. The circuit 1 as well as control apparatus 6 are supplied with energy by the vehicle battery 11. The actual voltage supply of the control apparatus 6 is sketched in the figure as voltage controller 61 which has the function of a voltage supply. The initially-mentioned travel or ignition switch is identified by reference numerals 12 and 13. With the ignition lock 12, which is actuable by the driver, the switch 13 is closed in the driving mode by means of the signal S3 and the control apparatus 6 is thereby connected directly to the vehicle battery (positive pole)(DIN identification: clamp 15). By opening the switch 13, the current/voltage supply to the control apparatus 6 is first interrupted. Other inputs/outputs of the control apparatus 6 are marked by reference numeral 8.

The circuit 1 includes a voltage supply 2 having a low current requirement as well as a device 3, which is supplied thereby, which, in a likewise reduced current consumption, is in the position to detect relevant changes at the selection switch 7. If the device 3 detects such relevant changes, for example, a transition to the "park" mode of the transmission, then the control apparatus 6 is connected for a limited time to the battery via an electronic switch or a relay 4 while bypassing the ignition switch 13 (permanent plus, DIN identification: clamp 30). The control apparatus 6 is thereby switched on.

A low current consumption of the device 3 can, for example, be achieved in that the circuit is configured to be especially high resistive and only a very low current flows via the selection switch 7.

Another possibility to achieve a reduced internal current draw comprises to supply the switch 7 or the entire circuit 1 cyclically with current for a short time (that is, at specific time intervals) and to inquire whether the position of the selection switch 7 has changed.

If the control apparatus 6 is supplied with energy by closing the switch 4 in response to a change of the position of the selection switch 7, then the control apparatus 6 can determine whether a discrepancy exists between the previously-adjusted or instantaneously present mechanical position in the transmission and the position of the selection switch.

If such a discrepancy is determined, then the supply of current to the control apparatus is continued (line d) and the mechanical position is adapted. After completing the action, the control apparatus 6 can again go into the rest mode. The control apparatus 6 can use the same switch 4 as the circuit 1 of the invention to control the internal supply of current.

The line d is therefore the control line of the control apparatus 6 for the switches 4 and 5. The second line is shown broken in the figure and can be used to control the signal S1 via the control apparatus 6.

To prevent a backflow of other control apparatus via the established connection between the two supply paths a and b (clamp 15 and clamp 30), it is purposeful to introduce a further switch 5 which functions in opposite phase to the above-mentioned switch 4 and interrupts the supply path a (clamp 15-feed line) to the control apparatus 6.

As an alternative or a supplement, it can be provided that the voltage controller 61 is connected to the vehicle battery 11 via two diodes as shown in the figure.

The circuit 1 of the invention and the control apparatus 6 can be integrated into a single housing 10 for cost reasons.

When using the invention, the control apparatus 6 remains ready for use without an unacceptably high current consumption for an ignition which is switched off.

The information I3 with respect to the position of the selection switch 7 is transmitted to the control apparatus 6 via the signal line c which is lead within the housing for an integration in one housing.

The information line d (signal I1) tells the control apparatus 6 which is switched on via the switch 4, that it was switched on because of a detected selection switch movement. Alternatively, or as a supplement, such an information I2 can be outputted also by the switch 5.

What is claimed is:

1. A system for operating a control apparatus for an automatic transmission in a motor vehicle equipped with a battery, the system comprising:

signal generating means for providing at least one input signal (I3) and applying said one input signal (I3) to said control apparatus;

a first energy supply device connected to said battery for supplying electrical energy at a first energy level;

a second energy supply device connected to said battery for supplying electrical energy at a second energy level greater than said first level;

a circuit connected between said signal generating means and said control apparatus;

said circuit including a detector for detecting changes in said one output signal (I3) and said detector being connected to said first energy supply device;

said circuit including switching means switchable between a first position wherein said battery is disconnected from said second energy supply device and a second position wherein said second energy supply device is connected to said battery; and, said detector functioning to generate an output to said switching means in response to a change in said output signal (I3) thereby causing said switching means to switch into said second position to activate said control apparatus.

2. The system of claim 1, wherein said system further comprises an ignition switch and said control apparatus is activated only when said control apparatus was previously deactivated by an actuation of said ignition switch; and, said ignition switch is connected to said control apparatus to bring said control apparatus into said operating state of deactivation when said ignition switch is actuated.

3. The system of claim 1, wherein said circuit has a lower internal current draw than said control apparatus; and, at least one of said detector and said switching means being adapted to be of high resistance.

4. The system of claim 1, wherein said first energy supply device has a lower internal current draw than said second energy supply device.

5. The system of claim 1, wherein said signal generating means is a selection switch actuable manually to different positions thereof by a driver of said motor vehicle; said input signal (I3) represents the position of said selection switch; and, the positions of said selection switch represent different and mechanical operating states of said motor vehicle; and, said operating states are adjusted by said control apparatus.

6. The system of claim 1, said circuit and said control apparatus being accommodated in one housing.

7. The system of claim 1, wherein said system further comprises a travel switch connecting or disconnecting said control apparatus to said battery when said travel switch is activated; and, in that state, in which the connection to said battery is interrupted by said travel switch, said circuit being adapted to activate said control apparatus and/or said second energy supply device in response to a change in said input signal (I3).

8. The system of claim 1, wherein said circuit including said first energy supply device which supplies said circuit with energy cyclically for a pregiven time duration.

9. The system of claim 8, wherein said system further comprises a travel switch which activates or deactivates said control apparatus; and, the cyclical energy supply of said circuit takes place in the state in which said control apparatus is deactivated by said travel switch.

10. A system for operating a control apparatus for an automatic transmission in a motor vehicle, the system comprising:

said means for providing at least one input signal (I3) and applying said one input signal (I3) to said control apparatus;

means for activating said control apparatus in response to a change of said input signal (I3); and, said means activating said control apparatus for a pregiven time duration in response to a change of said input signal (I3).

11. A system for operating a control apparatus for an automatic transmission in a motor vehicle, the system comprising:

means for providing at least one input signal (I3) and applying said one input signal (I3) to said control apparatus; and, means for activating said control apparatus in response to a change of said input signal (I3); and, said control apparatus remaining activated for a pregiven time in response to an activation which is effected by said means.

12. A system for operating a control apparatus for an automatic transmission in a motor vehicle, the system comprising:

means for providing at least one input signal (I3) and applying said one input signal (I3) to said control apparatus; and, means for activating said control apparatus in response to a change of said input signal (I3); and, said control apparatus remaining activated in response to an activation, which is effected by said means until the action, which is desired by the change of said input signal (I3), is completed by said control apparatus.

* * * * *